United States Patent [19]

Axelsson et al.

[11] 4,033,732
[45] July 5, 1977

[54] METHOD AND APPARATUS FOR CLEANING FABRIC FILTERS OF BAG TYPE OR THE LIKE

[75] Inventors: Birger Axelsson; Sven-Olof Rosby, both of Vaxjo, Sweden

[73] Assignee: Aktiebolaget Svenska Flaktfabriken, Stockholm, Sweden

[22] Filed: Apr. 29, 1975

[21] Appl. No.: 572,925

[30] Foreign Application Priority Data

May 2, 1974 Sweden .................... 7405903

[52] U.S. Cl. .................... 55/96; 55/302; 251/61.1; 137/590; 137/624.12
[51] Int. Cl.² .................... B01D 46/04
[58] Field of Search ............ 55/96, 271, 272, 273, 55/283, 293, 302, 303; 210/82, 412; 251/61.1, 144; 137/590, 624.12

[56] References Cited

UNITED STATES PATENTS

| 2,712,387 | 7/1955 | Young | 210/412 |
|---|---|---|---|
| 3,457,893 | 7/1969 | Lavalier | 55/302 |
| 3,521,430 | 7/1970 | Vanderlip et al. | 55/283 |
| 3,540,193 | 11/1970 | Pausch | 55/283 |
| 3,606,736 | 9/1971 | Leliaert et al. | 55/302 |
| 3,726,066 | 4/1973 | Colley et al. | 55/302 |
| 3,735,566 | 5/1973 | Laliwala | 55/273 |
| 3,757,497 | 9/1973 | Ray | 55/302 |
| 3,841,065 | 10/1974 | Espeel | 55/283 |

*Primary Examiner* — Bernard Nozick
*Assistant Examiner* — David L. Lacey
*Attorney, Agent, or Firm* — Cushman, Darby & Cushman

[57] ABSTRACT

In a method and apparatus for cleaning fabric filters of bag type or the like with a reverse flow of a gaseous medium improved cleaning action is achieved by applying the gaseous medium to the surface of the fabric opposite the dust-collecting surface in pulses which reach a high maximum value in as short a time as possible.

11 Claims, 10 Drawing Figures

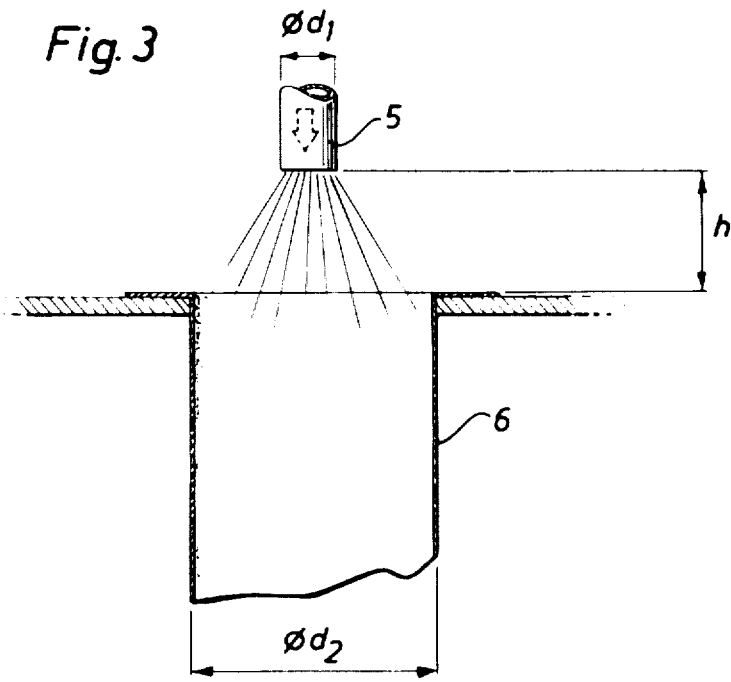
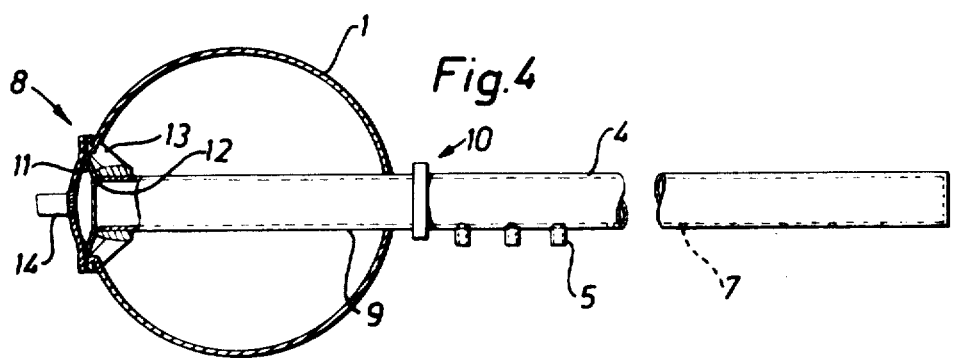
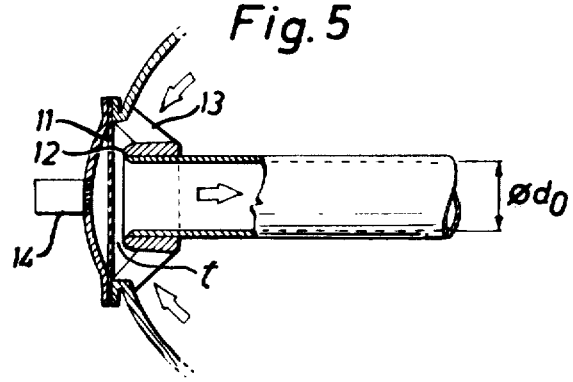

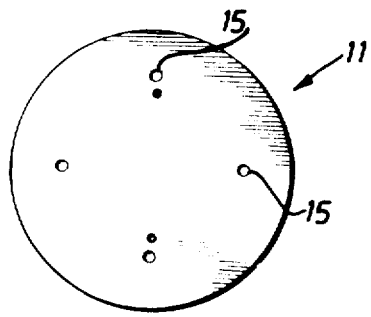
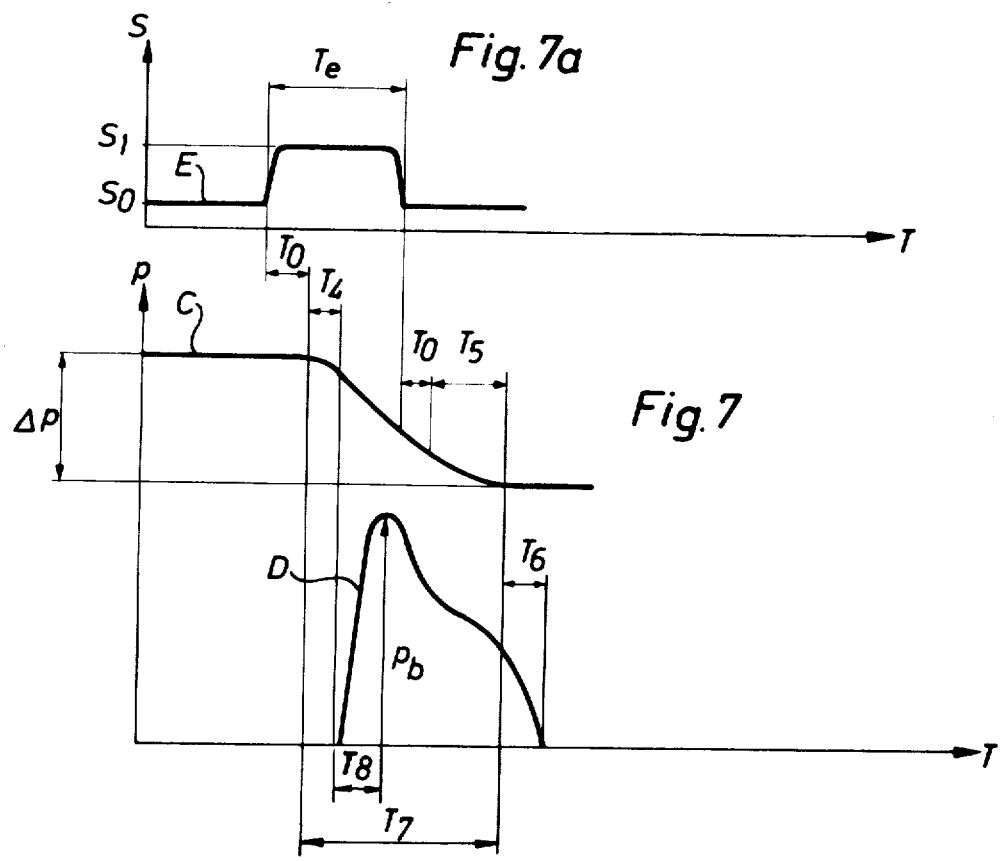

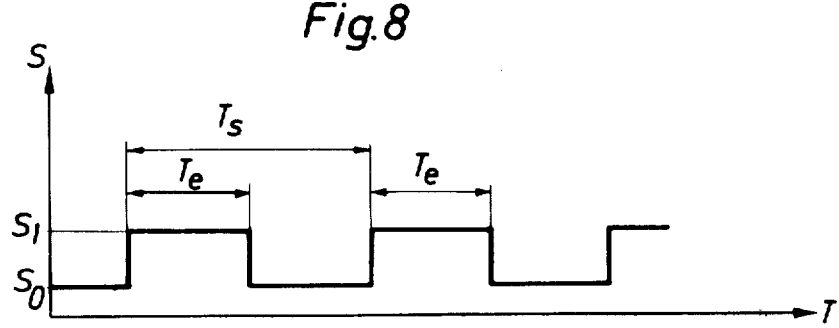
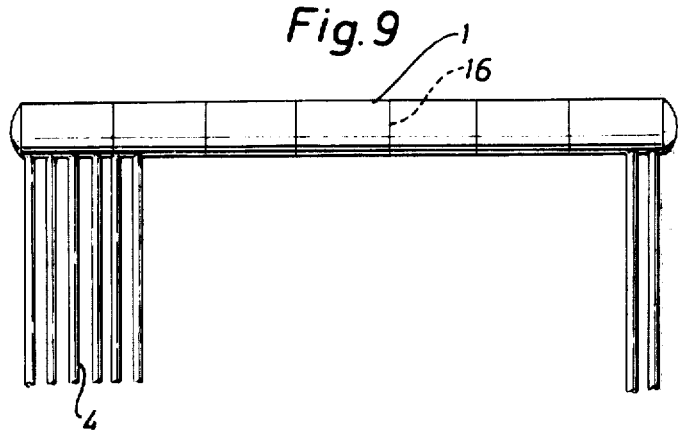

METHOD AND APPARATUS FOR CLEANING FABRIC FILTERS OF BAG TYPE OR THE LIKE

This invention relates to a method and apparatus for cleaning fabric filters of bag type or the like by exposing the filter bags to a pressure pulse of gaseous cleaning medium directed onto the side of the filter material opposite the side on which the dust particles collect. The cleaning gas is supplied to the filter bags through a cleaning apparatus comprising a pressure tank for containing the cleaning medium in the form of gaseous medium under pressure, preferably compressed air, a distribution passageway communicating with said tank and provided with nozzles or orifices directed to the apertures of the bags, a valve means and control means for producing the pressure pulse.

A plurality of different cleaning principles are applied in conjunction with fabric filters, for example cleaning by vibration, shaking, return air injection, compressed gas pulses, sound pulses, and combinations of these principles. The principle substantially being dealt with in the present invention is cleaning by compressed gas pulses, especially compressed air, hereinafter also called pressure pulses. Throughout the description and claims pressure is expressed in the international SI — System of Units. Thus, pressure is expressed as Pa (pascal units) or M Pa (mega pascal units).

In principle, cleaning by compressed air pulses is carried out in such a manner that the compressed air is distributed from a tank via a system of passageways to the fabric filter configuration being cleaned, for example, bags, and is injected into the bags through some kind of nozzle. The cleaning air flow having opposed direction relative to the operation gas flow cleans the bag of collected dust particles. The jet energy of the pressure pulse in the nozzle outlet is utilized for the co-ejection of surrounding air in order to rapidly fill the bag volume and obtain a large reversible through-flow (so-called ejected pulse). In most cases ejectors are utilized at the bag inlet for producing a good co-ejection effect. The pressure in the pressure tank usually is chosen to lie in the high-pressure range, i.e. that the excess pressure is between 0.4 MPa and 0.8 MPa. There exist also systems operating with lower pressure, for example, between 0.1 MPa and 0.2 MPa, and with a smaller or no ejecting flow (so-called direct-pulse). The object in such cases is to utilize the greater part of the jet flow directly for bag cleaning. One disadvantage of those systems, however, is that the compressed air consumption is higher than with systems operating according to the ejected-pulse principle. Moreover, the cleaning effect obtained with the known systems often has been unsatisfactory and thereby has jeopardized the serviceableness of the filter installation.

The dynamic procedures in a conventional direct-pulse system have been studied in detail by the applicants in order to more clearly understand the way in which the cleaning effects of reverse flow are obtained. It was found, by evaluation of the pressure developments in the tank, piping and filter bags and by direct comparisons with results obtained from pilot-scale and full-scale tests in actual installations, that the greatest cleaning effect was obtained by the pressure chock in the bag which preceded the air through-flow proper, i.e. the pressure acceleration-retardation procedure is more essential from the cleaning aspect than the subsequent flow of gas through the filter material. It was, thus, discovered that, for rendering the filter cleaning more efficient, it is essential to produce an improved gas pressure acceleration effect on the bag, and that this increased acceleration is to be brought about during the build-up of the pressure pulse in the bag.

The present invention is based on the concept that the time for the pressure pulse to reach its maximum value is as much as possible to be shortened, while the maximum value of the pressure pulse is to be set as high as possible. For realizing this object, a certain geometric relation between nozzle and filter medium configuration, for example bag, is required. The pressure transfer from nozzle to bag, which can be described by the impulse law and has been attested by practical tests, is most effective when the bag inlet and nozzle location are so chosen that as little as possible surrounding air is co-ejected. The velocity in pressure increase and the size of the maximum pressure pulse in the bag, further, are influenced by the flow losses of the air system, i.e. the energy available must be concentrated to the greatest possible extent to the air jet proper ejected from the nozzle. Of course, this is technically self-evident, and it is conventionally carried out also with a view to the manufacturing cost aspects. In a conventional system, the flow losses can be said to be concentrated to the valve, distribution pipe (friction and air distribution losses) and nozzles (inlet losses). The losses in the distribution pipe and nozzles can be effected in a conventional manner by changing the dimensions. This is, of course, also the case for the valve, but in order to bring about the higher velocity in pressure increase in the bag and possibly be able to interrupt the procedure immediately after the maximum and increased pressure pulse in the bag has been obtained, a more rapid and fully controlled opening and closing function than obtained with a conventional system build-up is required.

The present invention, therefore, relates to a method of cleaning fabric filters according to the direct-pulse principle and has as its object to provide a method and apparatus by which the efficiency of the cleaning is substantially improved and the air consumption is reduced.

The invention and its relation to known art is described in greater detail in the following, with reference to the accompanying drawings, in which FIG. 1 is a schematic view of a conventional prior art blow cleaning system;

FIG. 3 is a schematic view of a nozzle and bag in a direct-pulse system;

FIG. 4 is a schematic view of a blow cleaning system according to the invention;

FIG. 5 is a detail view of part of the system of FIG. 4 illustrating the valve with the diaphragm in open position;

FIG. 6 is a plan view of the valve diaphragm;

FIG. 7 is a graph illustrating the pressure relation in the tank and bag as a function of the time in a system according to the invention;

FIG. 7a is a graph illustrating the control impulse to the valve;

FIG. 8 is a graph illustrating the control impulse to the valve in a so-called pulse train; and FIG. 9 is a schematic view of a pressure tank divided into sections.

Figure 1:
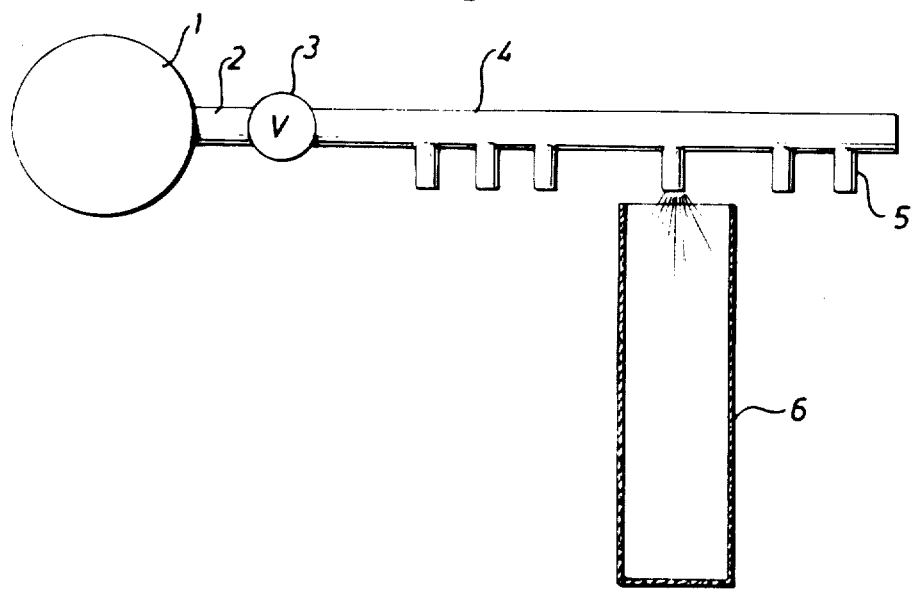

In FIG. 1, which refers to a conventional blow cleaning system employing the direct-pulse principle, there is shown a pressure tank 1 for cleaning medium in the form of compressed air.

Figure 2:
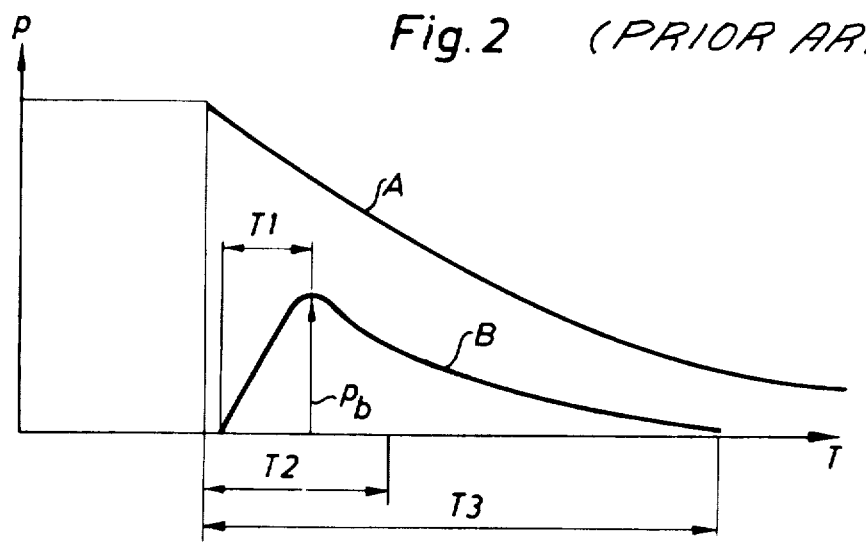
FIG. 2 is a graph of pressure versus time illustrating the pressure development in the tank and bag as a function of the time in a conventional system.

To the pressure tank 1 is connected a pipe 2, which is coupled to a valve 3. Upon opening the valve 3, a pressure pulse is produced which is led via a distribution passageway 4 to nozzle pipes 5, which are directed to the openings of filter bags 6. The graph in FIG. 2 shows more clearly the pressure conditions in the tank 1 and bag 6 when the valve 3 is being opened. The curve A represents the pressure in the tank after the valve 3 has been opened, and the curve B represents the pressure development in the bag 6. The time T1 represents the time for the bag pressure to rise from operation pressure to maximum pressure, which is designated by $P_b$. After the pressure has reached its maximum, a continuous decrease in pressure takes place owing to the air flowing out through the filter medium. It has been established by a plurality of pilot-tests as well as by full-scale tests, that the cleaning effect was not influenced when the time for which the valve had been held open was shortened from 0.7 second to about 0.2 second. These time intervals are indicated in FIG. 2 by T3 and T2, respectively. It was found that it is the velocity in pressure increase represented by the time T1 and the maximum value $P_b$ of the bag pressure chocks which render the essential cleaning effect. The subsequent flow of air through the filter medium is of minor importance in this respect. This was also confirmed by means of theoretical calculations.

In FIG. 3 is shown the location of the nozzle 5 in relation to the bag 6. It was found that, in order to obtain a minimum co-ejection of surrounding air, the distance $h$ between the outlet of a nozzle and the bag inlet must be chosen being between 25mm and 175mm for relations between nozzle and bag diameter $d_1/d_2$ of 0.012–0.030.

FIG. 4 shows the construction of a blow cleaning system according to the invention. The pressure tank 1 contains the cleaning medium in the form of compressed air. The distribution passageway 4, which communicates with the pressure tank 1, is provided with flow openings in the form of nozzle pipes 5 or in the form of apertures 7 directed to the bag opening. The distribution passageway 4 also comprises a portion 9 which projects into the tank 1 and has an end which opens into the tank 1. The two passageway portions 4 and 9 can be manufactured integrally or can be connected to each other by coupling means 10, which may be a bayonet type coupling or a flexible coupling with rubber sleeve and hose clips. At the open end of the passageway portion 9 a valve means 8 is provided. The valve means 8 comprises a movable valve member such as a flexible valve diaphragm 11 which in the position shown sealingly abuts a valve seat 12 disposed at the end of the distribution passageway. An O-ring may serve as a sealing between the distribution passageway and the valve seat. For fixing the end of the distribution passageway (and valve seat) with the shell surface of the tank 1, a connection 13 is provided. The valve diaphragm 11 is actuated by a pilot tube 14, which in its turn is controlled by a control system (not shown). The main requirement to be met by the control system is to emit control signals of sufficient speed. This can be realized in different ways by known art. It is presupposed in the following that the signals are emitted in the form of electric pulses. The valve means may also, within the scope of the invention be given a location other than that in the embodiment shown. The extended portion 9 of the distribution passageway, for example, can be made very short so that the valve seat in practice will be located closed to the tank shell surface where the passageway penetrates the tank wall. In such a case, the main part of the valve means will be located within the tank.

In FIG. 5 the valve means is shown in detail when the diaphragm 11 is in an open position. An annular gap $t$ is then formed between the valve seat 12 and the diaphragm 11. In order to render the operation of the valve satisfactory, the annular area $A_0 = \pi \cdot d_0 \cdot t$ for the air inlet is about the same as the cross-sectional area in the distribution passageway which is equal to $\pi d_0^2/4$. As a result of assembling the valve with the pressure tank, as shown in FIGS. 4 and 5, very low flow losses are obtained. This, together with a rapid opening and closing function of the valve, provides the pre-requisites for both the high velocity in pressure increase and an increased, maximum pressure pulse in the bag. As an example can be mentioned that at measurements made for a 3-inch valve a pressure drop coefficient (defined according to the relation $\Delta p = \xi \cdot p$ dyn) for the integrated valve function was obtained which was less than 20 percent of the value for the conventional valve function according to FIG. 1. Due to the fact that the valve is provided with a rapid control system, a very rapid closing of the valve is also obtained. This renders it possible to obtain a time interval between opening and closing of the valve which is very short, compared with conventional systems. Therefore, the cleaning procedure can be interrupted immediately after the maximum pressure pulse has been obtained in the bag, and this renders possible a substantial reduction of the air consumption.

FIG. 6 shows in detail the valve diaphragm 11 provided with so-called blow-off holes 15. The diaphragm 11 can be modified so as to match the opening and closing times with each other to an optimum combination. At measurements made on a commercially available valve a diaphragm opening time of 0.005 seconds and closing times of 0.03–0.05 seconds at a tank excess pressure of 0.11 MPa were obtained. By providing the diaphragm with three to four flow-off holes of 3 mm diameter, a twice-as-long opening time was obtained, but the closing time was reduced to about one half, which resulted in a shortened total of opening and closing times. The figures mentioned refer to a certain diaphragm mass, diaphragm rigidity and tank pressure. For higher pressures, for example, a thicker and therefore stronger diaphragm is required which, consequently, has a greater mass and requires other combinations of blow-off holes or corresponding measures.

In the following, the development of a pressure pulse is described in greater detail, reference being made to the FIGS. 7 and 7a. FIG. 7 is graph showing pressure $p$ as a function of the time T, and FIG. 7a, superimposed in FIG. 7, shows the control impulse S as a function of the time. In FIG. 7 the curve C represents the pressure relation in the pressure tank, the curve D represents the pressure relation in the filter-media configuration, which e.g. may be a bag, and curve E in FIG. 7a indicates the electric impulses controlling the opening and closing of the valve. The impulse level $S_0$ corresponds to an impulse for a closed valve, and the impulse level $S_1$ refers to an impulse for an open valve. After the electric impulse for valve opening has been released, a certain time TO, the so-called dead time, lapses before the physical valve opening commences. The opening time for the valve is T4 whereafter the dynamic flow is fully developed and causes the pressure rise in the bag to the maximum value $P_b$. When, after the release of the electric control impulse, a certain time has elapsed, the closing procedure commences so that the electric control impulse is broken. The length of the electric pulse is designated by $T_e$. When again a dead time TO has lapsed, the physical valve closing is commenced which takes the time T5. The time during which the valve is not closed thus, is the time T7. The time T6 is required for emptying the system. As pointed out earlier, the essential feature of the cleaning procedure is the rapid pressure pulse increase in the bag, i.e. the pressure rise which takes place during the time T8. Therefore, the procedure is to be interrupted as soon as the pressure pulse in the bag has reached its maximum value. This may imply, due to the shifting in time between the procedures in the valve and in the bag, that the electric impulse for valve closing must be given even before the pressure pulse in the bag has reached its maximum value. The electric pulse time $T_e$ between opening and closing, therefore, is made very short, for example 0.02 to 0.10 second, compared with conventional systems where the time is about 0.15 to 1.0 second. As an example can be mentioned that in tests with a system described above the electric impulse time for opening/closing was chosen on one occasion 0.040 second, at which occasion the time during which the valve was open, inclusive of the opening and closing time, was about 0.075 second. Times as short as about 0.020 second (electric impulse time) could be applied before a decrease in size of the compressed air pulse of the bag occurred. A corresponding pressure drop $\Delta p$ in the tank (tank volume 0.5m³) was 5000-40,000 Pa at an excess pressure in the tank which in the starting position was about 110,000 Pa, corresponding to a compressed air consumption of 0.020–0.20 m³ free air per blowing. Corresponding measurements in a conventional system according to FIG. 1 rendered air consumption figures of 0.40–0.60 m³ free air per blowing and a maximum pressure pulse in the bag which was lower by as much as 60%.

The velocity in pressure increase (i.e., the change in pressure with respect to time $t$) defined as $\Delta p$ bag $/ \Delta t$, which is achieved in the bag, has also been measured. As an example of the average velocity in pressure increase, i.e. $P_b/T8$, can be mentioned that by application of the invention a value exceeding 400,000 Pa/s (pascal per second) has been obtained at 0.11 MPa excess tank pressure and more than 1,200,000 Pa/s at 0.25 MPa excess tank pressure. The numerical relation between the pressure increasing rate and the initial air-pressure above atmospheric in the tank should be between 3 and 5, and the duration of the pressure pulse should be less than 100 milliseconds. The volume of the tank should be 5–20 times the volume of the distribution conduit. It can further be mentioned that this velocity in pressure increase is four to six times higher than that obtained with known art.

Compared with known systems the invention, thus, offers both a substantial improvement of the cleaning effect and a reduction of energy consumption.

It should, further, be pointed out that the maximum pressure pulse $P_b$ in the bag, of course, also is affected by the pressure prevailing in the tank. The object of the invention is to utilize primarily the low-pressure range with a tank excess pressure of 0.05–0.3 MPa, but it may be necessary for certain applications also to utilize the high-pressure range (0.3–1.0 MPa). Such utilization, thus, lies within the scope of the invention. The decision as to which tank pressure is to be chosen, is in practice a problem of optimizing, for which the entire filter function and the process application in question must be taken into consideration.

The diagram in FIG. 8 shows a variant of the control principle at which two or more pulses tightly following each other, so-called pulse trains, are produced. The time $T_e$ designates the length of a control pulse, and the time $T_s$ refers to the time interval between the beginning of two subsequent pulses. The pulse train can be obtained in a simple manner by electric forced control, so that a subsequent pulse already begins before the pressure in the tank has reassumed its original value. In order to achieve the greatest effect in relation to the air consumption, short time intervals are to be chosen. Suitable values are 20–50 ms (milliseconds) electric impulse time $T_e$ and a time difference $T_s$ about twice as great between the pulse train chocks. For a specific case, the values $T_e = 35$ ms and $T_s = 70$ ms have been tested. The effect of such a pulse train system, of course, depends to some extent on the capacity of the pressure producing system available, but irrespective thereof has been noted at tests in installations, that an additional improvement of the cleaning effect, compared with only one pulse, is obtained. In order to limit the compressed air consumption, it is possible to limit the volume of the tank, instead of substantially shortening the time during which the valve is held open. For special applications and sizes, the air consumption figures thereby obtainable, are almost as low as if the valve is given a short holding-open time. The smallest tank volume which can be used without reducing the amount of the maximum pressure pulse in the bag, is five to ten times greater than the volume of the air distribution passageways. FIG. 9 shows how the limited tank volume can be brought about at the construction of a full-scale filter installation. The pressure tank 1 is provided with distribution passageways 4 (shown partially). The tank is divided by partition walls 16 into sections, so that the volume of each tank section is so adjusted to the volume of the associated distribution passageways that the aforesaid requirements are met.

What is claimed is:

1. A method of cleaning fabric filters of bag type comprising exposing the surface of the filter material opposite the surface having dust particles collected thereon to a high gaseous pressure pulse passed to said surface opposite the dust-collecting surface from a pressure tank so as to cause flow of gas through the filter to remove particles from the dust-collecting surface, establishing said pressure pulse at a rate between 0.4 MPa/s and 1.2 MPa/s while keeping the numerical relation between said pressure increasing rate and the initial air pressure above the atmospheric in said pressure tank between 3 and 5, said initial air pressure being kept between 0.11 MPa and 0.25 MPa, said pressure pulse reaching its maximum within a time interval less than 30 milliseconds.

2. A method as in claim 1 including interrupting the pressure pulse when the pulse has reached its maximum value.

3. A method as in claim 2 wherein the duration of the pressure pulse is less than 100 milliseconds.

4. A method as in claim 2 wherein the duration of the pressure pulse is limited by supplying a reduced amount of pressurized gas.

5. A method as in claim 1 wherein at least two pressure pulses are applied with a short interval of time between the at least two pulses.

6. A method as in claim 5 wherein the duration of the at least two pulses is between 20 and 50 milliseconds and the time interval between the beginning of the at least two sequential pulses is less than 100 milliseconds.

7. Apparatus for cleaning bag-type fabric filters comprising a pressure tank for containing a pressurized gaseous medium, a gas distribution conduit provided with at least one flow opening for applying pressurized gas to the surface of a filter opposite the surface having dust particles collected thereon, said distribution conduit having an open end extending into the pressure tank and forming a valve seat within the tank, a movable valve member disposed with the tank and positioned adjacent the valve seat for opening and closing the valve seat, and fluid pressure control means for exerting a fluid pressure on the movable valve member to move the same into engagement with the valve seat.

8. Apparatus as in claim 7 wherein the distribution conduit extends into the tank at one location on the tank wall so that the valve seat is disposed near an opposite location on the tank wall.

9. Apparatus as in claim 7 wherein the valve seat and the movable valve member in the open position form an annular gap the cross-sectional area of which is substantially equal to the cross-sectional area of the distribution conduit.

10. Apparatus as in claim 7 wherein the volume of the pressure tank is 5–20 times the volume of the distribution conduit.

11. Apparatus as in claim 7 including a filter housing having a plurality of bag type filters therein said at least one flow opening comprises a plurality of spaced flow openings, and wherein said cleaning apparatus is connected to the filter housing such that said blow openings in the distribution conduit are disposed adjacent the filter surfaces opposite the dust-collecting surfaces.

* * * * *